United States Patent [19]

Nijman et al.

[11] Patent Number: 4,459,632

[45] Date of Patent: Jul. 10, 1984

[54] VOLTAGE-LIMITING CIRCUIT

[75] Inventors: Aloysius J. Nijman; Franciscus A. C. M. Schoofs, both of Eindhoven, Netherlands

[73] Assignee: U.S. Philips Corporation, New York, N.Y.

[21] Appl. No.: 321,847

[22] Filed: Nov. 16, 1981

[30] Foreign Application Priority Data

Nov. 25, 1980 [NL] Netherlands .......................... 8006411

[51] Int. Cl.³ .......................... H02H 1/00; H02H 5/04
[52] U.S. Cl. ..................................... 361/56; 361/103; 361/124
[58] Field of Search ............... 361/124, 125, 103, 105, 361/55, 56

[56] References Cited

U.S. PATENT DOCUMENTS

| | | | |
|---|---|---|---|
| 3,737,725 | 6/1973 | Donnelly | 361/56 |
| 4,068,277 | 1/1978 | Simokat | 361/111 X |
| 4,068,281 | 1/1978 | Harnden, Jr. | 361/106 |
| 4,168,514 | 9/1979 | Howell | 361/55 X |
| 4,191,985 | 3/1980 | Phillips, Jr. | 361/55 X |

*Primary Examiner*—Reinhard J. Eisenzopf
*Attorney, Agent, or Firm*—Thomas A. Briody; William J. Streeter

[57] ABSTRACT

An arrangement for providing protection against overheating in a voltage limiting circuit in the event of overvoltages comprises a series arrangement of a voltage limiting element and a heat sensitive switching element. The voltage limiting element and heat sensitive switching element are connected by a high conductivity heat path so that when the temperature of the element increases this increase is passed to the switching element which reduces or switches off the current in the line between terminals two terminals.

In operation a signal supply line is connected to terminal and the protected equipment is connected to terminal. The arrangement may be used to protect telephone exchange equipment from high voltages induced on telephone lines as a result, for example of lightning.

9 Claims, 10 Drawing Figures

4,459,632

VOLTAGE-LIMITING CIRCUIT

The invention relates to an arrangement for providing protection against overheating in a voltage-limiting circuit in the event of overvoltages, and for protecting equipment connected to this arrangement against overvoltage, comprising a series arrangement of a voltage-limiting element of the voltage-limiting circuit and a heat-sensitive switching element which forms a low resistance current path at the normal operating temperature and, when its temperature increases, has a higher resistance, the arrangement also having a first connection terminal for connection of the equipment to be protected, this connection terminal being provided at the place where the heat-sensitive switching element is connected to the voltage-limiting element.

BACKGROUND OF THE INVENTION

Such an arrangement is disclosed in U.S. Pat. No. 4,068,277.

In order to protect equipment connected to a telecommunication line against overvoltage, a primary protector and a secondary protector connected in parallel therewith are usually provided. The primary protector consists of, for example, a gas discharge tube or a carbon block. In the event of overvoltage such a protector reduces the line voltage to, for example, 180 V, after said voltage has first exceeded a threshold value of, for example, 400 V. However, actuation of this protector is subjected to a not insignificant turn-on time, in which the line voltage may still rise in certain circumstances to, for example, 1000 V. At the same time this protector does not offer a protection against voltages (for example 220 V) which are below the above-mentioned threshold value but which may still produce currents in the order of magnitude of 1 A. Currents of this magnitude may still cause damage. The secondary protector is intended to obviate the first-mentioned disadvantage of the primary protector. The conventional secondary protector comprises a rapidly switching voltage-limiting element such as, for example, a Zener diode or a voltage dependent resistor (VDR). This secondary protector is used to limit the line voltage during the switch-on period of the primary protector to, for example, 200 V. Thus, the protection against voltages induced by lightning is generally satisfactory. However, a short-circuit to mains, or a voltage induced from mains of the same order of magnitude as a result if unbalance in the mains supply, may cause destruction by overheating of the secondary protector of the fault persists for a period of, for example 0.1 seconds. This is of course unwanted. The problem in the existing situations is that the said power disturbances result in the destruction of the secondary protector. From the above-mentioned U.S. Pat. No. 4,068,277 it is known to avoid destruction by switching-off the line on which the disturbance occurs in the event of a power disturbance of, for example, 1 s or longer. The voltage-limiting circuit in said Patent Specification is a gas discharge tube. A heating coil which in the event of a power disturbance interrupts the contact between the said line and the gas discharge tube via a thermally operated switch is connected in series with said gas discharge tube.

A disadvantage of the said arrangements is that the heating coil and the voltage-limiting element may be provided in different locations and consequently may operate in different ambient temperature conditions, so that situations may occur in which overheating of the voltage-limiting element does not or not quickly enough result in switch-off of the line. A further disadvantage of the said arrangement is that a short circuit in or across that heating coil is possible; in that case overheating of the voltage-limiting element does not result in switch-off of the line.

SUMMARY OF THE INVENTION

It is an object of the invention to mitigate these disadvantages in a manner which is economical and reliable in operation. The invention provides a protection arrangement as described in the opening paragraph characterized in that a heat-conducting connection is provided between the voltage-limiting circuit and the heat-sensitive switching element. This heat-conducting connection has the considerable advantage that it makes the temperatures of the voltage-limiting circuit and the heat-sensitive switching element substantially equal. Thus, imminent overheating of the voltage-limiting circuit result in current limitation in the line in which the switching element has been connected.

Protecting a voltage-limiting circuit by bringing this circuit in thermal contact with one or more heat-sensitive switching elements is known per se from the U.S. Pat. No. 4,068,281. The arrangement disclosed in this U.S. patent does however not provide protection in the event of overvoltage to the equipment connected to it.

The series arrangement may comprise a second heat-sensitive switching element which is electrically connected to that terminal of the first mentioned voltage-limiting element which is not coupled to the first heat-sensitive switching element, the arrangement having a second connection terminal for the connection of the equipment to be protected, which terminal is provided in the place where the second heat-sensitive switching element is connected to the voltage-limiting element, that the first mentioned heat-sensitive switching element is electrically connected to the other terminal of the first voltage-limiting element and that a heat-conducting connection is provided between the voltage-limiting element and the second heat-sensitive switching element. This arrangement enables the voltage-limiting element to be protected against an overvoltage difference between two terminals of the voltage-limiting circuit rather than between one terminal and a reference voltage.

The arrangement may comprise a second and a third voltage-limiting element, the second voltage-limiting element being electrically connected to a terminal of the first voltage-limiting element, the third voltage-limiting element being electrically connected to the other terminal of the first voltage-limiting element and a heat-conducting connection being provided between the first switching element and the second voltage-limiting element and between the second switching element and the third voltage-limiting element.

The advantage of this protection arrangement is that it provides protection against both an overvoltage difference between two terminals of the voltage-limiting circuit and against a difference in potential at the terminals with respect to a reference voltage.

The invention further provides an arrangement as described in the opening paragraph, characterized in that the series arrangement comprises a third and fourth heat-sensitive switching element, the third switching element being connected to the first switching element, and the fourth switching element being connected to the second switching element, that the arrangement comprises a fourth and a fifth voltage-limiting element that the fourth voltage-limiting element is connected to the junction of the third and the first switching elements, that the fifth voltage-limiting element is connected to the junction of the fourth and the second switching elements and that a heat-conducting connection is provided between the fourth switching element and the fifth voltage-limiting element and between the third switching element and the fourth voltage-limiting element. This arrangement has the advantage that protection is provided not only against an overvoltage difference between two sides of the first voltage-limiting element but also against an overvoltage disturbance with respect to a reference voltage, earth, for example, which occurs at one of the two sides of the first voltage-limiting element. A further advantage of this protection arrangement is that in the event of an overvoltage a double current-impeding function is provided since two heat-sensitive switching elements are arranged in series.

The invention still further provides an arrangement as described in the opening paragraph, characterized in that the series arrangement comprises a sixth voltage-limiting element and a fifth switching element and a seventh voltage-limiting element and a third connection terminal for connection of the equipment to be protected, that the sixth voltage-limiting element is connected to the fifth switching element and to the first voltage-limiting element, that the first switching element is connected to the first voltage-limiting element and that the seventh voltage-limiting element is connected to the junction between the first and the sixth voltage-limiting elements, that the third connection terminal is provided at the junction between the fifth heat-sensitive switching element and the sixth voltage-limiting element, a heat-conducting connection being provided between the first voltage-limiting element and the first switching element and between the sixth voltage-limiting element and the fifth switching element. The advantage of this arrangement is that because of the combination of several voltage-limiting elements in the voltage-limiting circuit it provides a large freedom in the choice of the lower limit value of the overvoltage, as said limit value can be formed from the threshold voltages of several series-connected voltage dependent resistors.

Each voltage-limiting element which is thermally coupled by means of only one side to a heat-sensitive switching element or to a further voltage-limiting element may be provided with a heat sink on the face opposite thereto. This heat sink effects a temperature distribution inside the voltage-limiting element which reduces the likelihood of the whole voltage-limiting element or part thereof being overheated to such a degree that said element is damaged before the heat-sensitive switching element has attained a sufficiently high temperature to perform its current impeding function. So the heat sink reduces the risk of damage by overheating, particularly in the event that very much heat is quickly generated in the voltage-limiting element.

The arrangements in accordance with the invention may comprise voltage-dependent resistors (designated VDR's hereinafter), as voltage-limiting elements, and/or resistors having a high positive temperature coefficient—alternatively designated PTC-thermistors (denoted PTC's hereinafter)—as heat-sensitive switching elements.

BRIEF DESCRIPTION OF THE DRAWINGS

Embodiments of the invention will now be described by way of example, with reference to the accompanying drawings, in which.

DETAILED DESCRIPTION OF THE PREFERRED EMBODIMENTS

Figure 1:
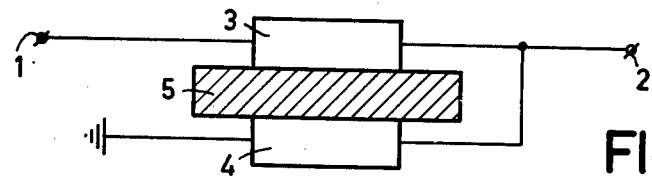
FIG. 1 shows a first embodiment of a protection arrangement in accordance with the invention.

The arrangement for providing protection against overheating due to overvoltage shown in FIG. 1 comprises a voltage-limiting element 4. This element has for its function to limit the overvoltage which may be present across this element. Several types of elements are available for this purpose such as, for example, a gas-filled discharge tube, a Zener diode or a voltage dependent resistor (VDR). The use of a VDR is particularly advantageous as it is an inexpensive component having small dimensions. In the further course of this description, it will be assumed that a VDR is used as the voltage-limiting element. At a normal operating voltage the VDR has such a high resistance that the current flowing through it may be neglected. In the event of an overvoltage the voltage across the VDR increases, which causes its resistance to decrease and the current through it to considerably increase. This effect counteracts the overvoltage and constitutes the voltage-limiting action of the VDR. If the increased current persists the temperature of the VDR continues to increase and damage to the VDR may occur. To prevent said damage occurring a switching element 3 which is coupled to the VDR 4 via a heat conducting connection 5 is arranged in series with the VDR 4. At the occurrence of an overvoltage disturbance, the VDR starts conducting current and hence becomes heated and in dependence on the heat transfer via the heat conducting connection 5, the heat sensitive switching element 3 becomes heated and will then start its current-impeding function a short time after the beginning of the overvoltage. Thus, the direct thermal coupling between the VDR 4 and the heat-sensitive switching element 3 has the advantage that overheating of the VDR 4 is prevented from occurring and that the current path to equipment connected to connection terminal 2 is substantially interrupted. The switching element 3 may be in the form of, for example, a bimetal switch or a PTC. A PTC it small, cheap and reliable in operation. For the further course of this description is will be assumed that the heat-sensitive switching element is in the form of a PTC. In all of the figures the VDR's and PTC's are shown as having their electrodes arranged on their narrow ends. However, in the majority of commercially available embodiments of these elements these electrodes are arranged on the broad sides of the element; this does not make any difference to the principle of operation of the circuit.

In one application of the arrangement for the protection of further equipment the PTC 3 is arranged in series between, for example a telecommunication line, not shown, which is connected to terminal 1 and the equipment to be protected, which is connected to terminal 2. In undisturbed operating conditions the PTC 3 provides a low resistance connection between the said line and equipment. The VDR 4 is connected between the terminal 2 and a reference voltage, earth for instance. The thermal coupling 5 between PTC 3 and VDR 4 causes the temperature of the PTC 3 to increase with increasing temperature of the VDR 4. As a result of this rise in temperature the resistance of the PTC 3 increases to such a high degree that the current through the PTC 3 and consequently also through the VDR 4 is limited to such a value that damage to VDR 4 and any equipment connected to terminal 2 is prevented. The reduction in the current flowing through the VDR 4 prevents the temperature of the VDR 4 increasing further. Once the overvoltage has disappeared, the PTC 3 and the VDR 4 cool down and the normal operating conditions, that is to say a relatively low resistance value of PTC 3 and a relatively high resistance value of VDR 4 are restored. So this mode of protection is self-restoring. The heat-conducting connection is constituted by the element 5. This element is of such a construction that an efficient heat transfer between the VDR 4 and the PTC 3 is possible. A thermally conductive and electrically insulating paste, such as, for example, thermal compound D1003, marketed by Schaffner A. G. has been found to be effective for this purpose. If the PTC 3 and the VDR 4 are mounted in a side-by-side relationship then this paste may be provided between these two elements.

Figure 2:
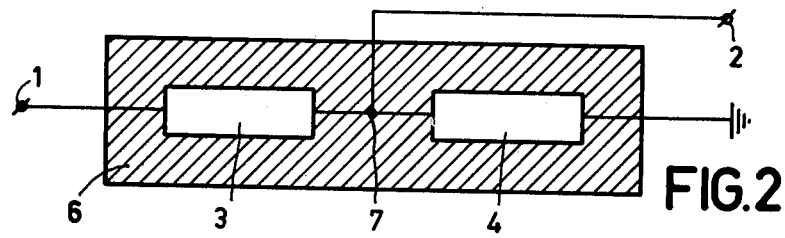
FIG. 2 shows a second embodiment of a protection arrangement in accordance with the invention.

A second embodiment, having a different conducting connection, or a protection arrangement in accordance with the invention is shown in FIG. 2. The PTC 3 and the VDR 4 are electrically interconnected via a conductor 7 and connected to the terminal 2. Thermal coupling is accomplished in this embodiment by embedding the components in the said paste which in FIG. 2 has been given the reference numeral 6. An advantage of this embodiment is the large degree of freedom one has in designing the protection arrangement, irrespective of the shape of the components. A further advantage of this embodiment is that the PTC 3 benefits more from the heat produced in the VDR 4 than in the arrangement shown in FIG. 1. A further advantage is that the occurrence of harmful thermal forces is reduced in this embodiment because of a more homogeneous heat distribution and because the components are embedded in a medium 6 which remains plastic.

Figure 3:
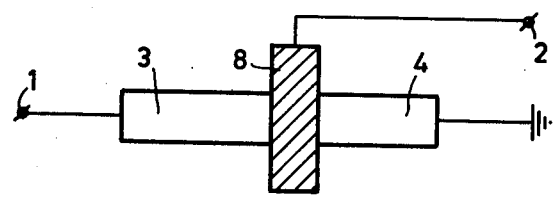
FIG. 3 shows a third embodiment of a protection arrangement in accordance with the invention.

A further embodiment of a protection arrangement in accordance with the invention is shown in FIG. 3. Both the electrical and the thermal connection between the PTC 3 and the VDR 4 is here formed by one element 8. This is realized by means of, for example, a copper plate. The terminal 2 for the connection of the apparatus to be protected by the VDR 4 is connected to the element 8.

This embodiment has the advantage of a very simple construction. In addition, this construction allows a low heat capacity of the element 8, for example because the plate may have a very small thickness or the element 8 may comprise only a solder layer. When a thermally good-conducting material, for example copper, is employed for the element 8 it is possible to obtain a very short response time for the operation of the protection arrangement.

Figure 4:
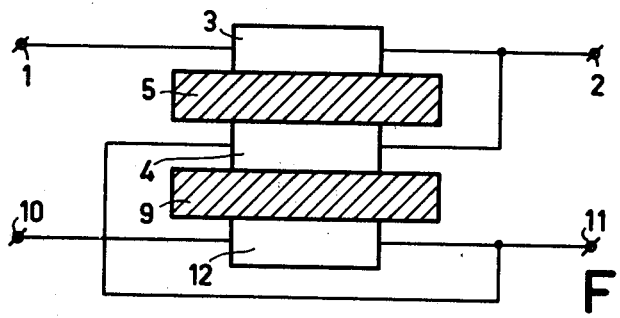
FIG. 4 shows a fourth embodiment of a protection arrangement in accordance with the invention in which the voltage-limiting circuit is protected from two sides.

FIG. 4 shows a further embodiment of the protection arrangement in accordance to the invention, which offers a protection against overvoltage between two lines. The VDR 4 is in thermal contact with the PTC 3 and a further PTC 12 via heat-conducting connections 5 and 9 respectively. One side of the VDR 4 is connected to the terminal 2, the other side of the VDR 4 is connected to a terminal 11 to which the PTC 12 is also connected. The other side of the PTC 12 is connected to a terminal 10. An overvoltage difference between the two sides of the VDR 4 results in the current flow through both PTC 3 and through PTC 12 being impeded. This is caused by a rise in temperature of the PTC 3 and the PTC 12 which is caused by the rise in temperature of VDR 4 being transmitted via the heat-conducting elements 5 and 9. Each heat-conducting connection 5 and 9 may be of a construction as described with reference to FIG. 1 or FIG. 3. Heat contact between the PTC's 3 and 12 and the VDR 4 can also be established in the manner described with reference to FIG. 2.

This protection arrangement is particularly suitable for coupling an electrically floating apparatus to a floating telecommunication line. To this end the apparatus is connected between the terminals 2 and 11 and a two-wire telecommunication line is connected to the terminals 1 and 10.

Figure 5:
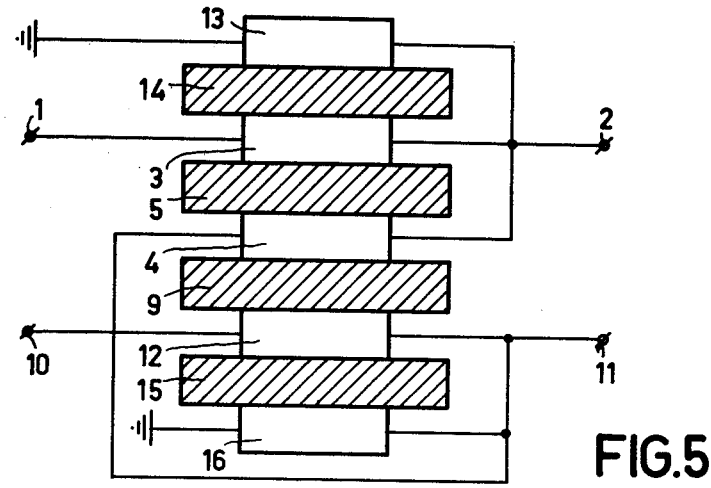
FIG. 5 shows a fifth embodiment of the protection arrangement in accordance with the invention which provides protection against overvoltages on one line and on both lines.

The embodiment shown in FIG. 5 of the protection arrangement in accordance with the invention is an extension of the arrangement shown in FIG. 4. Two voltage-dependent resistors 13 and 16 with associated thermal connections 14 and 15 are added to the arrangement shown in FIG. 4. This results in the arrangement of FIG. 5, in which the VDR 13 is electrically connected to terminal 2 and to a fixed reference voltage, earth in this instance, and thermally connected to PTC 3 via the thermally conducting connection 14. The VDR 16 is electrically connected to terminal 11 and to a fixed reference voltage, earth in this instance, and is thermally connected to PTC 12 via the thermally conducting connection 15. This embodiment provides protection against overvoltages on each line as well as between both lines. An overvoltage difference between two sides of the VDR 4 causes both PTC 3 and PTC 12 perform the current-impeding function. An overvoltage disturbance with respect to a fixed reference voltage, earth in this instance, and either of the two sides 2 or 11 of VDR 4 results in the PTC 3 or PTC 12 performing the current-impeding function at that side. The operation of this arrangement is the combined operating mode of the arrangements described with reference to FIGS. 1 and 4. Each of the heat-conducting connections 5, 9, 14 and 15 may be formed in a manner as described with reference to any of the preceding Figures. Telecommunication apparatus can be coupled to telecommunication lines via this protection arrangement. This manner of coupling is very suitable for protecting the said apparatus against both overvoltage differences between the lines and against overvoltage with respect to a fixed reference voltage, earth in this instance, on each of the lines. In this coupling mode the connection of the lines and the telecommunication apparatus to be protected corresponds to the connection described with reference to FIG. 4.

Figure 6:
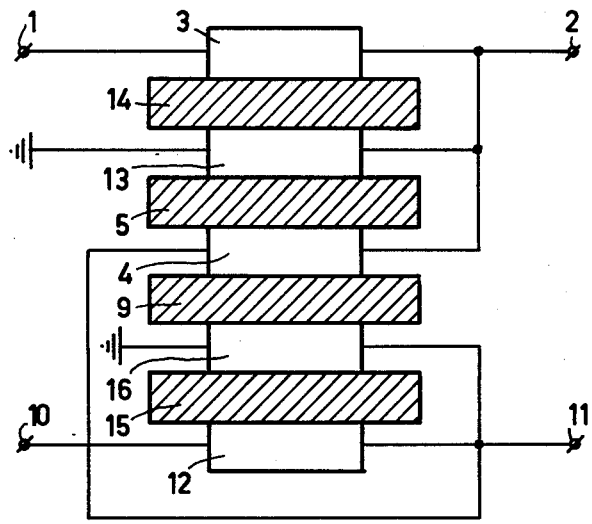
FIG. 6 shows a modification of the arrangement of FIG. 5 with a different arrangement of the elements.

The embodiment in accordance with the invention shown in FIG. 6 is a modification of the embodiment described with reference to FIG. 5. The embodiment shown here has a different arrangement of the elements, which has the advantage that a heat distribution is obtained within this arrangement which accomplishes a response time of the arrangement which, depending on the dimensioning may have a value different from the value of the embodiment shown in FIG. 5. This may be advantageous in certain circumstances. The thermal connection between the PTC 3 and the VDR 4 is formed, in the present embodiment, by the elements 5, 13 and 14, which are connected in series as far as heat conduction is concerned. Likewise, the thermal connection between the VDR 4 and the PTC 12 is formed by the elements 9, 16 and 15, which are connected in series as far as heat conduction is concerned.

Figure 7:
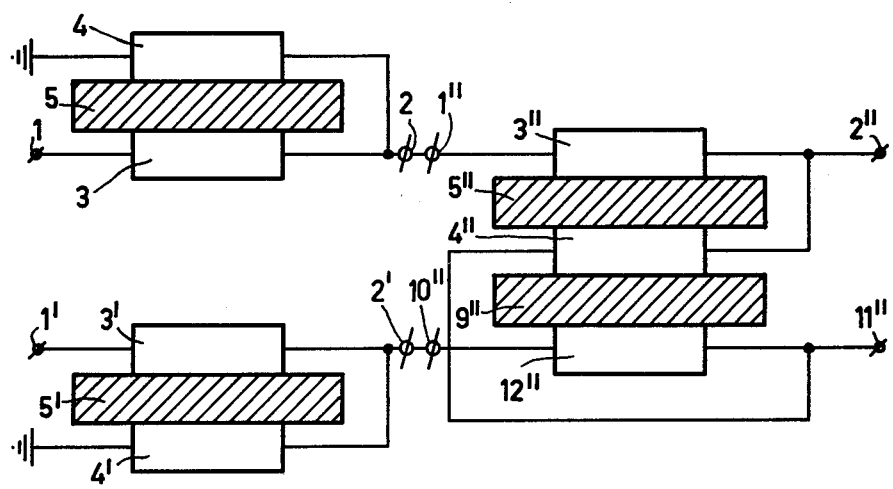
FIG. 7 shows a sixth embodiment of a protection arrangement in accordance with the invention having a dual current impeding function in the event of an overvoltage disturbance on one line.

The configuration of the embodiment of the protection arrangement in accordance with the invention as shown in FIG. 7 is assembled from an arrangement as shown in FIG. 4 and two arrangements as shown in FIG. 1. In FIG. 7, a first arrangement as shown in FIG. 1 has its terminal 2 connected to terminal 1 of an arrangement as shown in FIG. 4 (whose reference numerals have been provided with ") and a second arrangement as shown in FIG. 1 (whose reference numerals have been provided with ') has its terminal 2' connected to terminal 10" of the arrangement in accordance with FIG. 4. Instead of the arrangement as shown in FIG. 1 the arrangement shown in FIG. 2 or FIG. 3 may alternatively be used. Either of these arrangements may be connected to the arrangement shown in FIG. 4 in an identical manner to that described in the foregoing with reference to the arrangement shown in FIG. 1. When telecommunication apparatus is coupled to telecommunication lines via the protection arrangement of FIG. 7 at least one overvoltage protection is provided in each of the lines. In addition to the protective function described with reference to the embodiments shown in the FIGS. 5 and 6, said arrangement has the additional advantage that two current-impeding PTC's (3, 3" and 3', 12", respectively) are provided in series in a line between the terminals 1, 2" and 1' and 11", respectively, if in the event of an overvoltage disturbance on the lines both the VDR 4" and one of the voltage-dependent resistors 4 and 4' or both voltage-dependent resistors 4 and 4' respond. If in the event of an overvoltage disturbance on both lines only the VDR 4" responds then both lines are blocked by at least one PTC.

Figure 8:
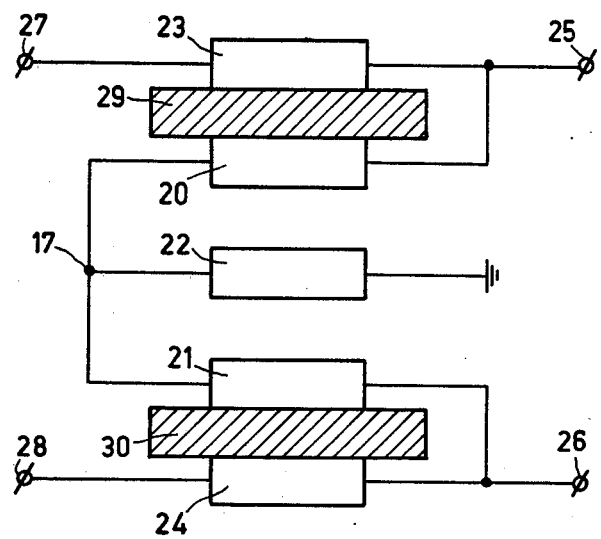
FIG. 8 shows a seventh embodiment of a protection arrangement in which double the voltage may flow across the voltage-limiting circuit.

The embodiment of the arrangement in accordance with the invention shown in FIG. 8 comprises a star-network of three voltage-dependent resistors 20, 21 and 22, the common node 17 of which is coupled to PTC 23 and PTC 24, via the voltage-dependent resistors 20 and 21 respectively. The PTC 23 and that end of the VDR 20 which is not connected to the common node are connected to a terminal 25. The end of the VDR 22 which is not connected to the common node is connected to a fixed reference voltage, earth in this instance. The PTC 24 and that end of the VDR 21 which is not connected to the common node are connected to a terminal 26. That end of the PTC 23 which is not connected to terminal 25 is connected to a terminal 27 and that end of the PTC 24 which is not connected to terminal 26 is connected to a terminal 28. A heat-conducting connection 29 is provided between the VDR 20 and the PTC 23 and a heat-conducting connection 30 is provided between the VDR 21 and the PTC 24. The heat-conducting connections 29 and 30 may each be carried out in a similar manner to that described with reference to FIGS. 1, 2 and 3. Telecommunication apparatus can be coupled to telecommunication lines via this protection arrangement. This embodiment also provides an overvoltage protection from disturbances on one or on both lines. When a VDR is used as the element which limits the voltage on, for example, a telecommunication line, the operating voltage is defined as the voltage across the VDR which is produced when the VDR conducts a current whose magnitude is prescribed by the administration as the current which, in the event of overvoltage, the protection arrangement must be capable of discharging. In addition, the safety voltage between two points is defined as being a voltage having a prescribed value which must not be exceeded by the absolute value of the voltage difference between these points. If a safety voltage having a certain value is desired between two points then this can be approximately satisfied by coupling those two points, via, for example, one VDR having an operating voltage equal to that safety voltage. The present embodiment has the advantage that by connecting the voltage-dependent resistors in series, safety voltage may approximately be realized which are unequal to the respective operating voltages of the individual voltage dependent resistors. A further advantage of this embodiment is that, when used as an overvoltage protection on a pair of lines, it provides the possibility of protection against an overvoltage difference between the two lines which is different from the difference between the safety voltages of those lines with respect to a fixed reference.

Figure 9:
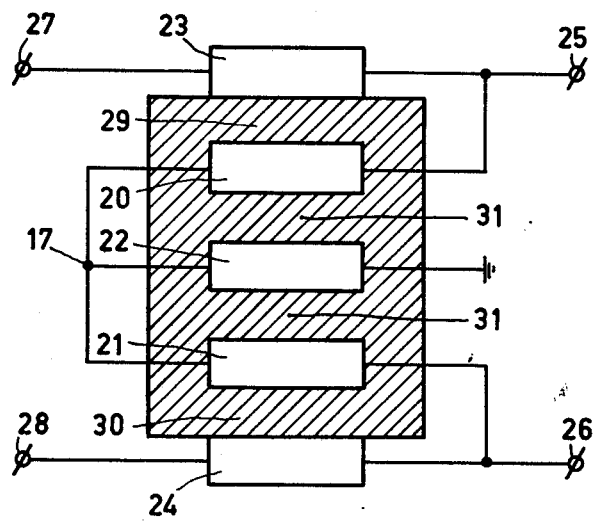
FIG. 9 shows a modification of the protection arrangement of FIG. 8.

The arrangement shown in FIG. 9 is a variant of the arrangement shown in FIG. 8. In the arrangement of FIG. 9 a heat-conducting connection 31 is provided between the voltage-dependent resistors 20, 21 and 22. There is also a heat-conducting connection between the VDR 22 and the PTC 23 and between the VDR 22 and the PTC 24. These last-mentioned two connections may form part of element 30. It is alternatively possible to form these two connections by the thermal series arrangement of the elements 20, 29, 31 and the thermal series arrangement of the elements 21, 30 and 31, respectively. The advantage of these three thermal connections in the embodiment shown in FIG. 9 is that the heat generated in VDR 22 is also employed. This additional heat serves to effect a shorter response time for the protection arrangement shown in FIG. 9 compared with the response time of the arrangement shown in FIG. 8.

Figure 10:
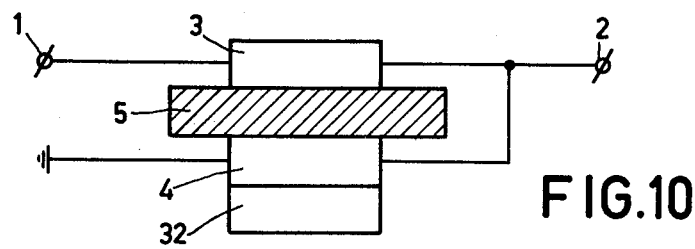
FIG. 10 shows a eighth embodiment of the protection arrangement of FIG. 1 to which a heat sink has been added.

The embodiment shown in FIG. 10 comprises a heat sink 32, which is disposed on that side of the VDR 4 which faces the side which is thermally connected to another element, for instance PTC 3, of this arrangement. A VDR which is connected on one side (the contacting side) to an other element and which is cooled at the other side (the side which is exposed to the air) by the ambient air, will, since air has a much lower cooling capacity than the material at the contacting side, reach a considerably higher temperature at the side exposed to the air than at the contacting side, when a large quantity of heat is generated in its interior. Thus, it is possible that, at the side exposed to the air, the VDR is damaged by overheating before its contacting side—and consequently the PTC—has become so hot that the PTC starts performing its current-impeding function. To limit the temperature it is possible to provide the last-mentioned side with a piece of material having such a heat capacity and heat-conducting capacity that the temperature at the side onto which the material has been applied does not increase to such an extent that overheating is the result. This possibility to limit the temperature on said side of a VDR is not limited to the embodiment shown in FIG. 10, but may be employed in every embodiment in which a surface of a VDR which surface is not contacted by another element of the arrangement would obtain a higher temperature than that surface of the VDR is contacted by another element of the arrangement.

What is claimed is:

1. A protection circuit for providing protection against overheating in a voltage-limiting circuit in the event of overvoltages and for protecting equipment connected to said circuit against overvoltage comprising:
   a first heat sensitive switching element serially connected between first and second connection terminals;
   a second heat sensitive switching element connected between third and fourth connection terminals;
   a voltage-limiting element connected between said second connection terminal and said fourth connection terminal; and,
   first and second heat transfer elements connected between said voltage-limiting element and said first and second heat sensitive switching elements, whereby an increase in temperature in said voltage-limiting element is directly transferred to said switching elements.

2. A protection circuit as claimed in claim 1, wherein a second and a third voltage-limiting element are provided, the second voltage-limiting element electrically connected to a terminal of the first voltage-limiting element, the third voltage-limiting element being electrically connected to the other terminal of the first voltage-limiting element, and a heat-conducting connection provided between the first switching element and the second voltage-limiting element and between the second switching element and the third voltage-limiting element.

3. A protection circuit as claimed in claim 1 wherein third and fourth heat-sensitive switching elements are provided, the third switching element being serially connected to the first switching element and the fourth switching element being serially connected to the second switching element, and a second and a third-voltage-limiting element, the second voltage-limiting element electrically connected to the electric junction of the third and the first switching elements, the third voltage-limiting element electrically connected to the electric junction of the fourth and the second switching elements, and that a heat-conducting connection is provided between the fourth switching element and the third voltage-limiting element and between the third switching element and the second-voltage limiting element.

4. An arrangement as claimed in claim 1 wherein said voltage-limiting element is a voltage-dependent resistor.

5. An arrangement as claimed in claim 1 wherein said heat-sensitive switching element is a thermistor having a positive temperature coefficient.

6. An arrangement as claimed in claim 1 wherein said voltage-limiting element, which has only one side thermally coupled to a heat-sensitive switching element, is provided on the opposite side with a heat sink.

7. A circuit arrangement for providing protection against overheating in the event of overvoltage and for the protection of equipment connected to said circuit arrangement comprising:
   first and second heat sensitive switching elements,
   first, second and third voltage limiting elements,
   first, second, third and fourth terminals, and
   first and second thermal conductive elements,
   said first thermal conductive element being connected between said first heat sensitive switching element and said first voltage limiting element, said second thermal conductive element being connected between said second heat sensitive switching element and said third voltage limiting element, one end of said first heat sensitive switching element and said first voltage limiting element being connected to said first terminal, the other end of said first heat sensitive switching element being connected to said second terminal, the other end of said first voltage limiting element being connected to the junction of one end of said second and third voltage limiting elements, the other end of said second voltage limiting element being connected to ground, the end of said third voltage limiting element being connected to the junction of said second heat sensitive switching element and said third terminal, the other end of said second heat sensitive switching element being connected to said fourth terminal.

8. The circuit arrangement as claimed in claim 7 wherein said first, second and third voltage limiting elements are embedded in a composite thermal conduction element and wherein said first and second heat sensitive switching elements are in thermal contact with said composite thermal element.

9. The circuit arrangement as claimed in claim 7 comprising third and fourth thermal conductive elements, said third thermal conductive element being connected between said first and second voltage limiting elements, said fourth thermal conductive element being connected between said second and third voltage limiting elements and wherein one end of said first heat sensitive switching element, said first and second voltage limiting elements are connected to said first terminal, the other end of said first heat sensitive switching element being connected to said second terminal, the other end of said first voltage limiting element and one end of said third voltage limiting element being connected to ground, the other end of said second and third voltage limiting elements and one end of said second heat sensitive element being connected to said third terminal, and the other end of said second heat sensitive element being connected to said fourth terminal.

* * * * *